(12) United States Patent
Toi

(10) Patent No.: US 11,223,378 B2
(45) Date of Patent: Jan. 11, 2022

(54) SEMICONDUCTOR INTEGRATED CIRCUIT, TRANSMISSION DEVICE, AND CONTROL METHOD OF TRANSMISSION DEVICE

(71) Applicant: Kioxia Corporation, Tokyo (JP)

(72) Inventor: Takashi Toi, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/010,207

(22) Filed: Sep. 2, 2020

(65) Prior Publication Data

US 2021/0306016 A1    Sep. 30, 2021

(30) Foreign Application Priority Data

Mar. 24, 2020  (JP) .............................. JP2020-052407

(51) Int. Cl.
*H04B 1/04*  (2006.01)
*H04L 25/08*  (2006.01)
*H04L 25/03*  (2006.01)

(52) U.S. Cl.
CPC ..... *H04B 1/0475* (2013.01); *H04L 25/03343* (2013.01); *H04L 25/085* (2013.01)

(58) Field of Classification Search
CPC ... H04B 1/62; H04B 1/0475; H04L 25/03343; H04L 25/085
See application file for complete search history.

(56) References Cited

U.S. PATENT DOCUMENTS

| 9,438,350 B1* | 9/2016 | Schmidt ........... H04B 10/50572 |
| 2012/0219085 A1* | 8/2012 | Long ....................... H04L 27/28 375/295 |
| 2020/0106649 A1* | 4/2020 | Peng ................... H03F 3/45237 |

* cited by examiner

*Primary Examiner* — Sung S Ahn
(74) *Attorney, Agent, or Firm* — Foley & Lardner LLP

(57) ABSTRACT

A semiconductor integrated circuit includes a first circuit configured to carry out digital-to-analog conversion on input data; a high-pass filter configured to reduce a component, the component having a frequency lower than a predetermined cutoff frequency, in delayed input data obtained by delaying the input data, and output the delayed input data; a second circuit configured to carryout the digital-to-analog conversion on the delayed input data that passes through the high-pass filter; and a third circuit configured to drive a transmission signal, the transmission signal based on an addition signal obtained by adding an output signal of the first circuit and an output signal of the second circuit.

20 Claims, 6 Drawing Sheets

(1UI-spaced FFE)

(Half UI-spaced FFE)

(IDEAL
50 Ω TERMINATION)

(4 dB LOSS + IDEAL
50 Ω TERMINATION)

SEMICONDUCTOR INTEGRATED CIRCUIT, TRANSMISSION DEVICE, AND CONTROL METHOD OF TRANSMISSION DEVICE

CROSS-REFERENCE TO RELATED APPLICATION(S)

This application is based upon and claims the benefit of priority from. Japanese Patent Application No. 2020-052407, filed Mar. 24, 2020, the entire contents of which are incorporated herein by reference.

FIELD

Embodiments described herein relate generally to a semiconductor integrated circuit, a transmission device, and a control method of a transmission device.

BACKGROUND

When data transmission is carried out with high speed between a transmission device and a reception device, if transmission data has a high amount of jittering, an opening of an eye (EYE) waveform of the transmission data received by the reception device becomes narrow.

More specifically, a signal output from the transmission device reaches the reception device with attenuation, reflection, or the like bypassing through a transmission line formed by a wiring on a board, a copper cable, a connector, or the like.

At this time, the transmission line has a transmission loss characteristic (an insertion loss) in which a high frequency component is largely attenuated as compared with a low frequency component. A waveform rounding or an inter-symbol interference (ISI) of the transmission data generated due to this insertion loss functions to prevent a sufficient opening of the eye waveform in the reception device.

Therefore, to compensate the waveform rounding or the ISI, a feed forward equalizer (FFE) that raises a gain of a Nyquist frequency related to a data transfer band is used.

Half UI-spaced FFE or the like is proposed as a method of raising the gain of a frequency higher than the Nyquist frequency.

An opening of an eye waveform of a pulse amplitude modulation 4 (PAM-4) waveform (hereafter referred to as PAM-4 waveform) corresponding to a bit pattern of a modulation signal of 2 bits is greatly opened by raising the gain of the frequency higher than the Nyquist frequency.

However, the above Half UI-spaced FFE requires using a clock signal having a frequency twice that of the FFE in the related art or a multi-phase clock signal, which complicates a circuit configuration and increases a circuit scale.

DETAILED DESCRIPTION

Embodiments provide a semiconductor integrated circuit, a transmission device, and a control method of a transmission device, which can widen an opening of an eye waveform.

In general, according to at least one embodiment, a semiconductor integrated circuit includes: a first circuit configured to carry out a digital-to-analog conversion on input data; a high-pass filter configured to reduce a component, the component having a frequency lower than a predetermined cutoff frequency, in delayed input data obtained by delaying the input data, and output the delayed input data; a second circuit configured to carry out the digital-to-analog conversion on the delayed input data that passes through the high-pass filter; and a third circuit configured to drive a transmission signal, the transmission signal based on an addition signal obtained by adding an output signal of the first circuit and an output signal of the second circuit.

Hereinafter, a reception device according to at least one embodiment will be described in detail with reference to the attached drawings. The present disclosure is not limited to any embodiment.

Figure 1:
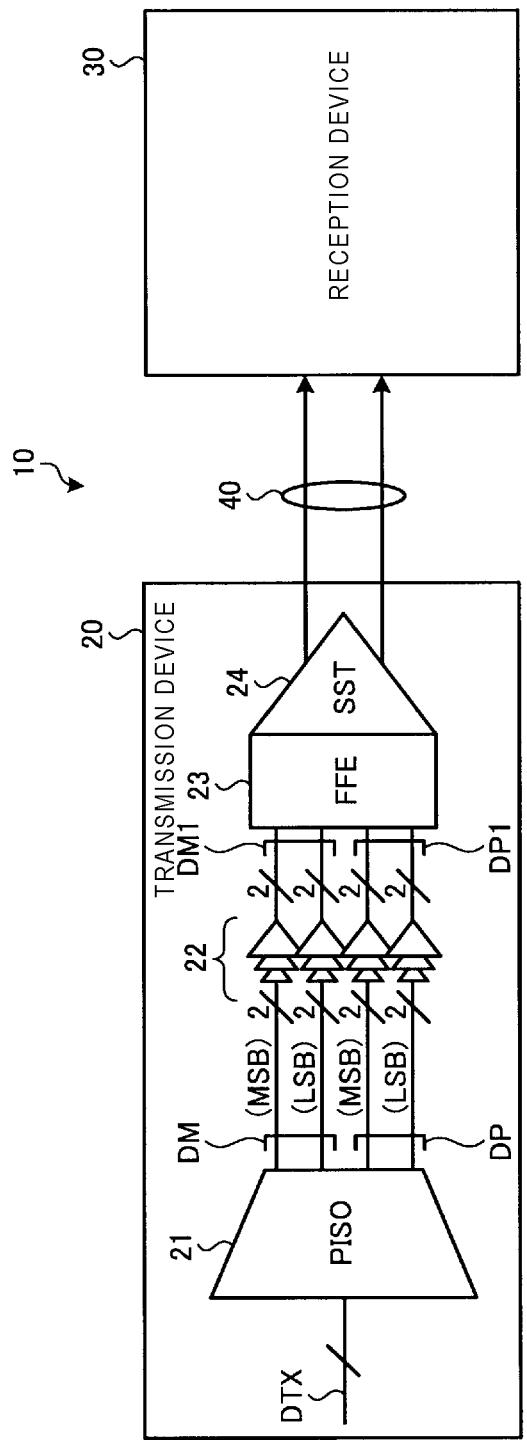
FIG. 1 is a schematic configuration block diagram of a communication system according to at least one embodiment.

FIG. 1 is a schematic configuration block diagram of a communication system according to at least one embodiment.

A communication system 10 according to at least one embodiment includes a transmission device 20, a reception device 30, and a differential transmission line 40.

The transmission device 20 includes a deserializer 21, an adjustment circuit 22, a feed forward equalizer (FFE) circuit 23, and a driver circuit 24.

The deserializer 21 carries out a parallel-to-serial conversion on input transmission data DTX.

The adjustment circuit 22 adjusts a phase of data to be transmitted.

The FFE circuit 23 is a digital equalizer that compensates an inter-symbol interference (ISI) of the data to be transmitted.

The driver circuit 24 is a source serial termination (SST) driver that implements data transmission by a differential transmission method.

In the above configuration, the deserializer 21 outputs main data DM in the PAM-4 format that corresponds to current transmission data DTX, and post data DP in the PM-4 format that corresponds to past transmission data DTX. The deserializer 21 generates the post data DP as data obtained by delaying the main data DM. The post data DP is data obtained by sampling serial data parallel-to-serial converted by the deserializer 21 before the main data DM.

The main data DM includes high-order bit (MSB) data and low-order bit (LSB) data in the PAM-4 format.

Similarly, the post data DP includes the high-order bit (MSB) data and the low-order bit (LSB) data in the PAM-4 format.

On the other hand, the reception device 30 receives an analog differential transmission signal via the differential transmission line 40, generates reception data from the received differential transmission signal, and carries out various processing based on the generated reception data.

Figure 2:
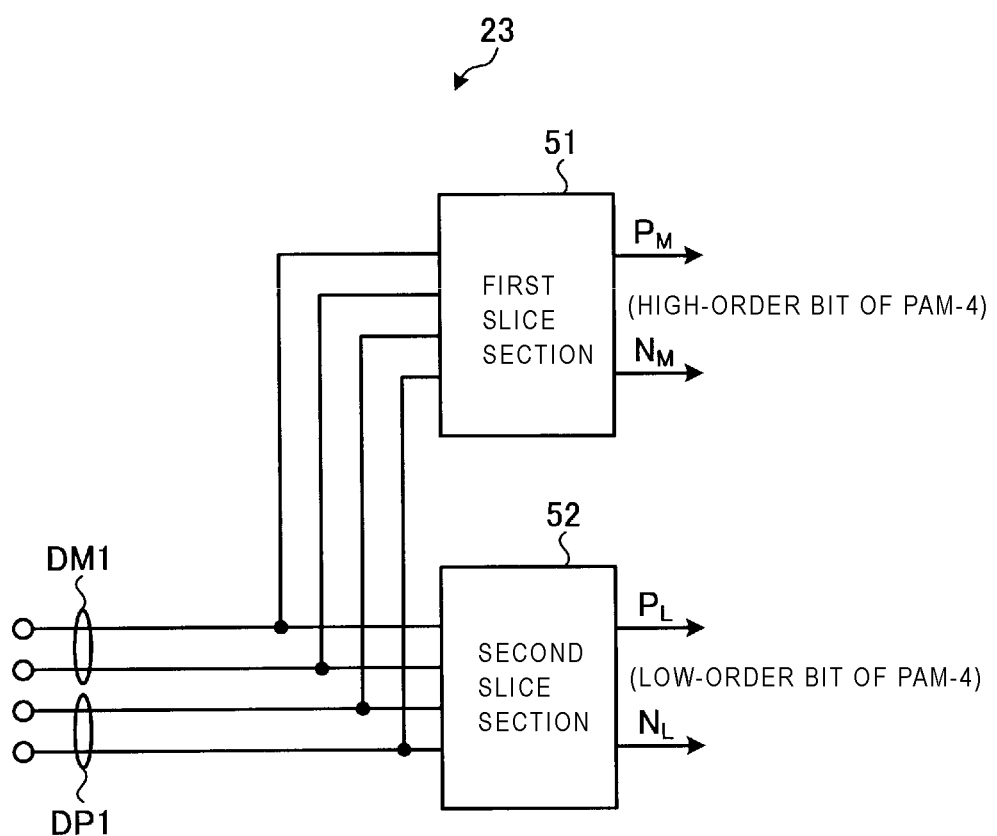
FIG. 2 is a block diagram showing a schematic configuration of an FFE.

FIG. 2 is a schematic functional configuration block diagram of the FFE.

The FFE 23 carries out a digital processing and an analog processing on main data DM1 that is differential input data and post data DP1 that is the differential input data, and outputs processed results.

Here, the main data DM1 is data corresponding to the main data DM. The post data DP1 is data corresponding to the post data DP obtained by delaying the main data DM in the deserializer 21.

More specifically, the main data DM1 and the post data DP1 are data obtained by adjusting the main data DM and the post data DP output from the deserializer 21 by the adjustment circuit 22.

The FFE 23 includes a first slice section 51 and a second slice section 52.

The first slice section 51 carries out the digital-to-analog conversion of the main data DM1 and the post data DP1, and outputs high-order bit signals $P_M$ and $N_M$ of PAM-4 as a conversion result.

The second slice section 52 carries out the digital-to-analog conversion of the main data DM1 and the post data DP1, and outputs low-order bit signals $P_L$ and $N_L$ of the PAM-4 as the conversion result.

Here, the high-order bit signals $P_M$ and $N_M$ of the PAM-4 and the low-order bit signals $P_L$ and $N_L$ of the PAM-4 each are differential output signals.

Figure 3:
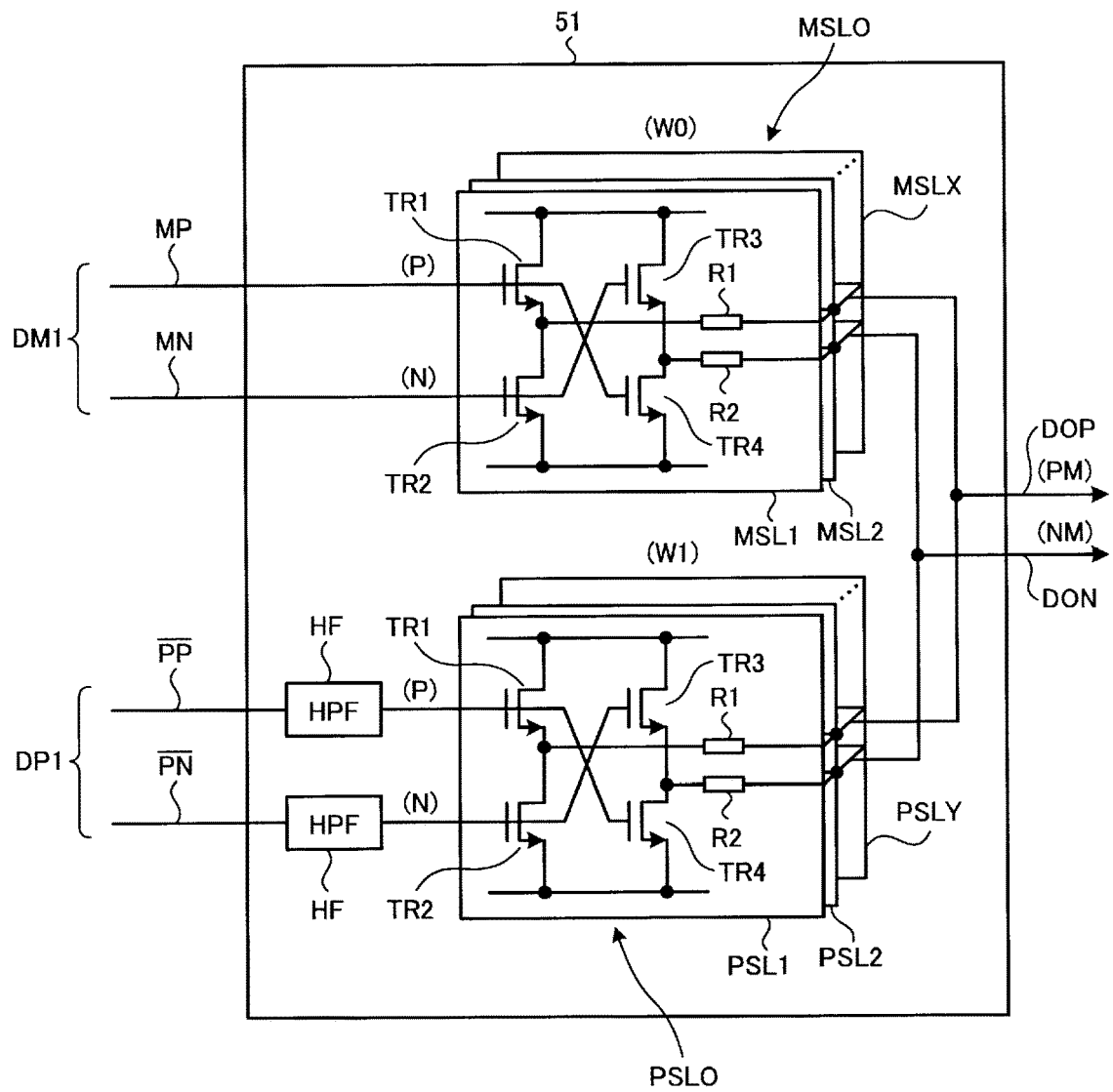
FIG. 3 is a diagram for illustrating a schematic configuration of a first slice section.

FIG. 3 is a schematic configuration diagram showing the first slice section.

In the above configuration, the first slice section 51 and the second slice section 52 include the same configuration, and therefore the first slice section 51 will be described as an example here.

The first slice section 51 includes a main slice section MSL0, a pair of high-pass filters (HPF) HF, and a post slice section PSL0.

The main slice section MSL0 converts positive phase data MP and negative phase data MN that form the main data DM, which is the differential input data, into output signals.

The main slice section MSL0 includes a plurality of sub-main slice sections MSL1 to MSLX which convert the same positive phase data MP and negative phase data MN into the output signals.

In this case, the number X (X is an integer of 1 or more) of the sub-main slice sections MSL1 to MSLX is a value corresponding to a value of a multiplier W0 by which the positive phase data MP and the negative phase data MN are respectively multiplied.

The pair of high-pass filters (HPF) HF has characteristics of reducing the gain of a component having the frequency lower than a particular cutoff frequency for each of inverted positive phase data/PP and inverted negative phase data/PN that form the post data DP1, which is the differential input data, and effectively passing a high frequency component higher than the particular cutoff frequency.

The post slice section PSL0 converts the inverted positive phase data/PP and the inverted negative phase data/PN that pass through the pair of high-pass filters HF into the output signals.

Therefore, the post slice section PSL0 functions as a pre-emphasis circuit for previously amplifying and transmitting a high frequency component that may be attenuated in the differential transmission line 40.

The post-slice unit PSL0 includes a plurality of sub-post slice sections PSL1 to PSLY that convert the same inverted positive phase data/PP and inverted negative phase data/PN after passing through the high-pass filters HF into the output signals.

In this case, the number Y (Y is an integer of 1 or more) of the sub-post slice sections PSL1 to PSLY is a value corresponding to a value of a multiplier W1 by which the inverted positive phase data/PP and the inverted negative phase data/PN are respectively multiplied. The number X of the sub-main slice sections MSL1 to MSLX and the number Y of the sub-post slice sections PSL1 to PSLY have the same value.

In some embodiments in the above configuration, the sub-main slice sections MSL1 to MSLX and the sub-post slice sections PSL1 to PSLY have the same configuration. Therefore, a configuration of the sub-main slice section MSL1 will be described here.

The sub-main slice section MSL1 includes a first transistor TR1, a second transistor TR2, a third transistor TR3, a fourth transistor TR4, a first resistor R1, and a second resistor R2.

Here, the first transistor TR1, the second transistor TR2, the third transistor TR3, and the fourth transistor TR4 are an N-channel type transistor.

The first transistor TR1 includes a gate terminal to which a signal on a positive phase side is input, a drain terminal connected to a high potential side power supply, and a source terminal.

The second transistor TR2 includes a gate terminal to which a signal on a negative phase side is input, a drain terminal connected to the source terminal of the first transistor TR1, and a source terminal connected to a low potential side power supply.

The third transistor TR3 includes a gate terminal commonly connected to the gate terminal of the second transistor TR2, a drain terminal connected to the high potential side power supply, and a source terminal.

The fourth transistor TR4 includes a gate terminal commonly connected to the gate terminal of the first transistor TR1, a drain terminal connected to the source terminal of the third transistor TR3, and a source terminal connected to the low potential side power supply.

The first resistor R1 includes one end (a first end) connected to a connection point between the source terminal of the first transistor TR1 and the drain terminal of the second transistor TR2, and another end (a second end) connected to a positive phase side output terminal of the main slice section MSL0.

The second resistor R2 includes one end (a first end) connected to a connection point between the source terminal of the third transistor TR3 and the drain terminal of the fourth transistor TR4, and another end (a second end) connected to a negative phase side output terminal of the main slice section MSL0.

According to the above configuration, the first transistor TR1 and the fourth transistor TR4 may carry out on/off operations at the same timing.

Similarly, the second transistor TR2 and the third transistor TR3 may carry out the on/off operations at the same timing.

Then, the first transistor TR1 and the fourth transistor TR4, as well as the second transistor TR2 and the third transistor TR3 operate complementarily.

That is, when the first transistor TR1 and the fourth transistor TR4 are turned on, the second transistor TR2 and the third transistor TR3 are turned off.

Similarly, when the first transistor TR1 and the fourth transistor TR4 are turned off, the second transistor TR2 and the third transistor TR3 are turned on.

Since output terminals of the respective sub-main slice sections MSL1 to MSLX are commonly connected, processing results corresponding to X pieces of positive phase data MP output by each of the sub-main slice sections MSL1 to MSLX are added and output as one piece of positive phase data.

Similarly, since the output terminals of the respective sub-main slice sections MSL1 to MSLX are commonly connected, processing results corresponding to X pieces of negative phase data MN output by each of the sub-main slice sections MSL1 to MSLX are added and output as one piece of negative phase data.

Similarly, since output terminals of the respective sub-post slice sections PSL1 to PSLY are commonly connected, processing results corresponding to Y pieces of positive phase data MP output by each of the sub-post slice sections PSL1 to PSLY are added and output as one piece of positive phase data.

Similarly, since the output terminals of the respective sub-post slice sections PSL1 to PSLY are commonly connected, processing results corresponding to Y pieces of negative phase data MN output by each of the sub-post slice sections PSL1 to PSLY are added and output as one piece of negative phase data.

Therefore, an output DOP of the positive phase side output terminal and an output DON of the negative phase side output terminal, which are data output from the first slice section 51, are complementary.

The first slice section 51 and the second slice section 52 include such a configuration each function as a finite impulse response filter.

Figure 4:
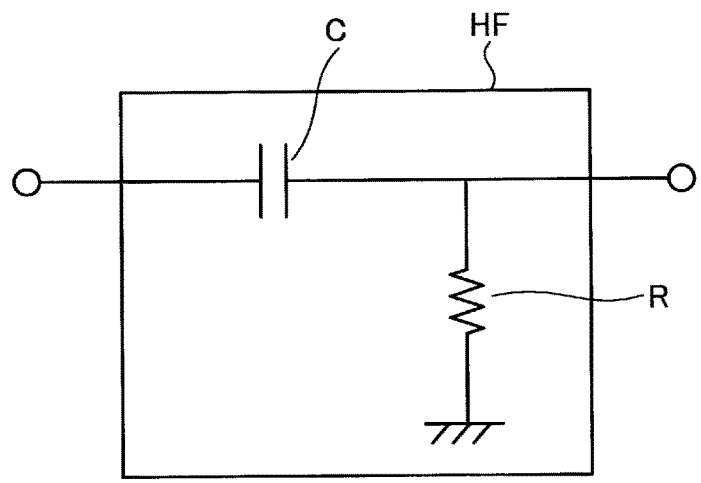
FIG. 4 is a diagram for illustrating a configuration example of a high-pass filter.

FIG. 4 is a diagram showing a configuration example of the high-pass filter.

In FIG. 4, the high-pass filter HF is configured as a primary RC high-pass filter.

That is, the high-pass filter HF includes a capacitor C inserted in series between input and output terminals, and a resistor R connected between a line that connects the capacitor C and the output terminal, and the low potential side power supply.

In this arrangement, a time constant of the high-pass filter HF needs to be within a range of 0.5 to 1 unit interval (UI) of a transmitted signal. In addition, in order to operate the FFE 23 more stably, the time constant of the high-pass filter HF may be set to a smaller value (more preferably 0.5 UI).

In the above description, the high-pass filter HF is configured as the primary RC high-pass filter, but the present disclosure is not limited to this, and a high-pass filter may be similarly applied as long as the high-pass filter has a predetermined time constant.

Figure 5:
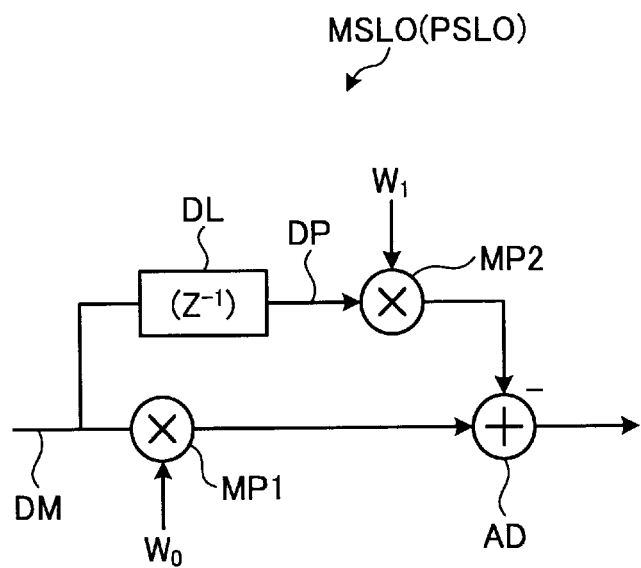
FIG. 5 is an equivalent circuit diagram of a main slice section or a post slice section.

FIG. 5 is an equivalent circuit diagram of the main slice section or the post slice section.

In the above configuration, the main slice section MSL0 and the post slice section PSL0 have different input signals.

However, since the main slice section MSL0 and the post slice section PSL0 include the same configuration, the main slice section MSL0 will be described here as an example.

The main slice section MSL0 includes a multiplier MP1, a delay circuit DL, a multiplier MP2, and an adder AD. The multiplier MP1 multiplies the input main data DM by a coefficient W0 and outputs a product. The delay circuit DL delays the input main data DM for a predetermined time and outputs the main data DM as the post data DP. The multiplier MP2 multiplies the post data DP by a coefficient W1 and outputs a product. The adder AD adds an inverted output of the multiplier MP2 to an output of the multiplier MP1, and effectively carries out a subtraction.

Next, an operation of at least one embodiment will be described.

Figure 6A:
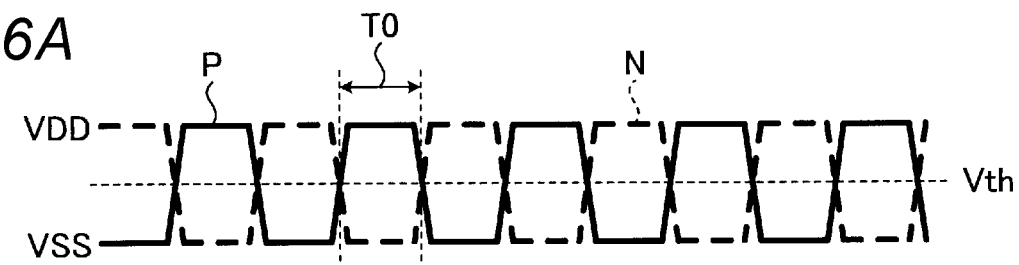
FIGS. 6A and 6B are operation diagrams of the embodiment.
Figure 6B:
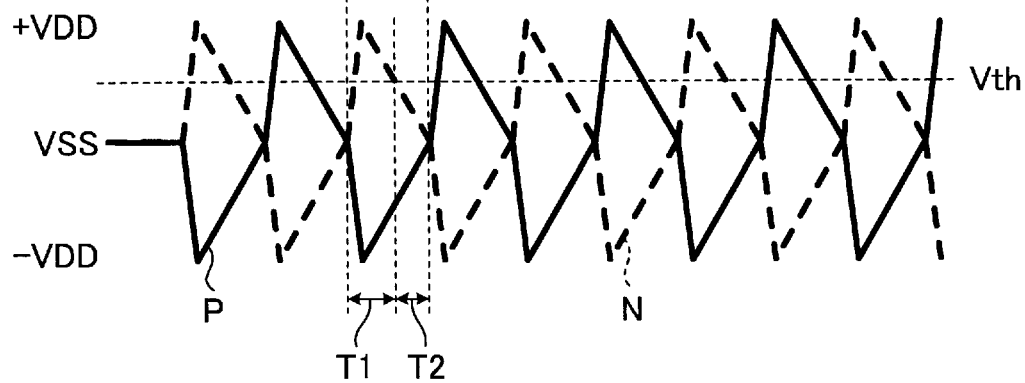

FIGS. 6A and 6B show operation diagrams of FFEs according to a comparative example and the embodiment.

Figure 7A:
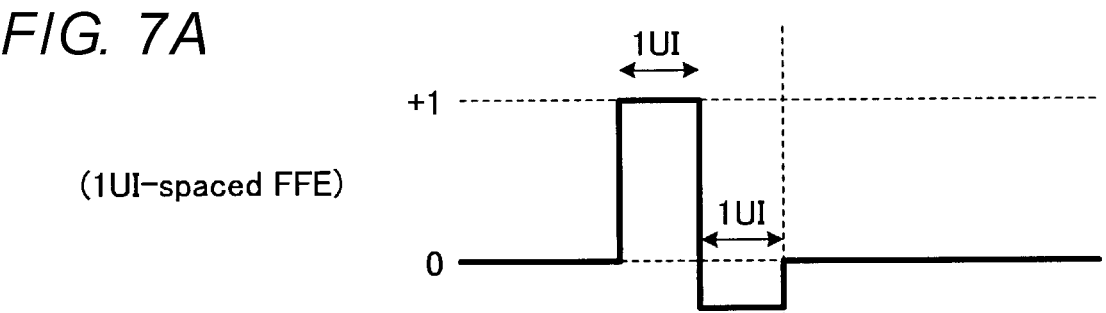
FIGS. 7A to 7C are diagrams showing 1-bit response waveforms of the FFE.
Figure 7B:
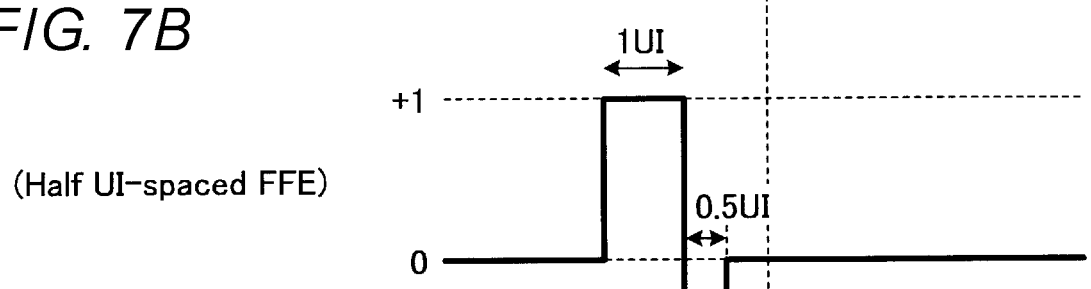
Figure 7C:
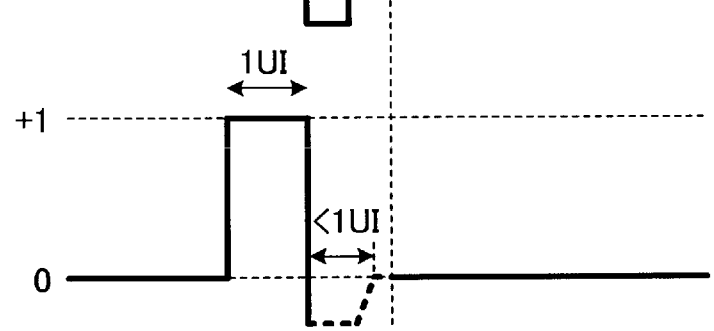

FIGS. 7A to 7C are diagrams showing 1-bit response waveforms of the FFEs according to comparative examples and the embodiment.

In FIG. 6A is an operation diagram of the FFE according to a first comparative example. In the first comparative example, the high-pass filters HF included in the FFE 23 according to at least one embodiment are not included.

As shown in FIG. 6A, since one of a positive phase side signal P and a negative phase side signal N surely exceeds a threshold value Vth, the FFE according to the comparative example is always in an operating state (an ON state).

As a result, in the FFE (1 UI-spaced FFE) according to the first comparative example, an impulse response waveform when a 1-bit signal transition in which a signal transitions from "0" to "1" as shown in FIG. 7A is made. That is, when the signal transition is made from "L" to "H" to "L", at a timing when the signal transition is from "H" to "L", a space of 1 UI until the signal stabilizes at "L" level is generated.

In addition, in the FFE (Half UI-spaced FFE) according to a second comparative example using a double clock signal or a multi-phase clock signal, the impulse response waveform when the signal transitions from "0" to "1" as shown in FIG. 7B generates a space of 0.5 UI of the transmitted signal until the signal stabilizes at the "L" level.

FIG. 7C is an operation diagram of at least one embodiment.

On the other hand, according to the FFE 23 according to at least one embodiment, as shown in FIG. 6B, both the positive phase side signal P and the negative phase side signal N that pass through the high-pass filter HF exceed the threshold value Vth in a period T1 during a period T0, so that the operating state is set; and both the positive phase side signal P and the negative phase side signal N fall below the threshold value Vth in a period T2, so that a non-operating state (an OFF state) is set.

As a result, the 1-bit response waveform when the signal transitions from "0" to "1" is an intermediate waveform between the 1 UI-spaced FFE and the Half UI-spaced FFE, as shown in FIG. 7C, although a clock signal the same as the FFE (the 1 UI-spaced FFE) of the first comparative example is used.

Therefore, a signal in which the eye waveform is open compared to the 1 UI-spaced FFE of the first comparative example can be obtained with a configuration simpler than the Half UI-spaced FFE of the second comparative example.

FIGS. 8A to 8D are diagrams showing effects of the embodiment.

Figure 8A:
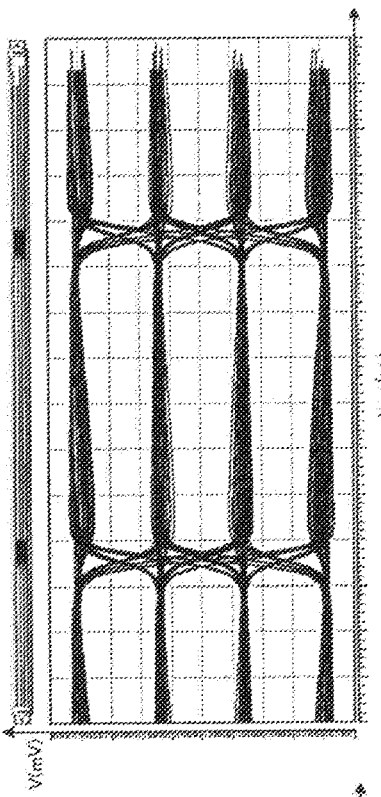
FIGS. 8A to 8D are diagrams showing effects of at least one embodiment.

FIG. 8A is a diagram showing the eye waveform of the PAM-4 signal in which an output of the 1 UI-spaced FFE according to the first comparative example is received at an ideal 50Ω termination.

Figure 8B:
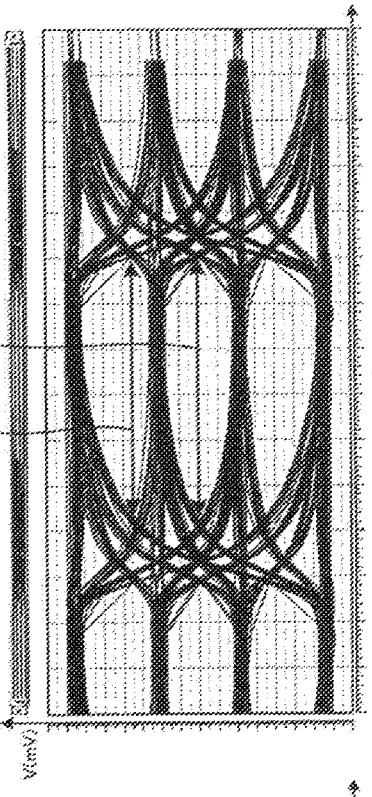

FIG. 8B is a diagram showing the eye waveform of the PAM-4 signal in which an output of the FFE 23 according to the embodiment is received at the ideal 50Ω termination.

As shown in FIG. 8B, at the ideal 50Ω termination, the waveform is similar to that in FIG. 8A, but it can be seen that the eye waveform is more open when the FFE 23 is in the non-operating state (the OFF state) in a latter half.

Figure 8C:
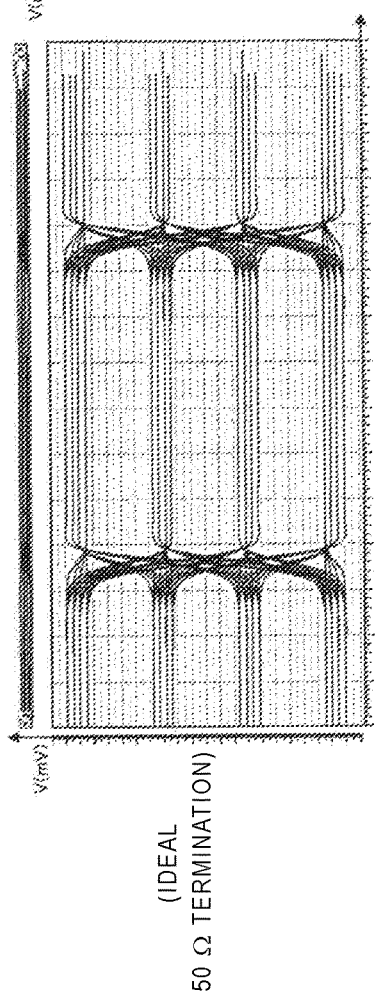

In addition, FIG. 8C shows an eye waveform of the PAM-4 signal when the output of the 1 UI-spaced FFE according to the first comparative example is received at the ideal 50Ω termination and a transmission loss of the differential transmission line 40 is 4 dB.

Figure 8D:
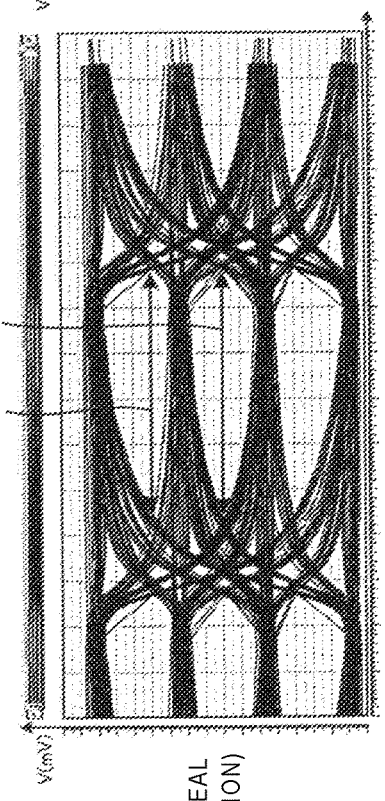

FIG. 8D shows an eye waveform of the PAM-4 signal when the output of the FFE 23 according to at least one embodiment is received at the ideal 50Ω termination and the transmission loss of the differential transmission line 40 is 4 dB.

As shown in FIG. 8D, lengths L1 and L2 of an opening of the eye waveform in a time axis direction are longer than lengths L11 and L12 of the opening of the eye waveform in the time axis direction of FIG. 8C, respectively (L1>L11, L2>L12), and it can be seen that transmission with higher quality than the 1 UI-spaced FFE of the first comparative example can be carried out with a simpler configuration.

As described above, according to at least one embodiment, by inserting the high-pass filters in an input path of the post data, it is possible to implement an eye opening characteristic close to a characteristic of the Half UI-spaced FFE which requires the double clock signal or the multi-phase clock signal by using a clock signal the same as the 1 UI-spaced FFE. Thus, it is possible to carry out a high-speed data communication with high reliability.

Therefore, even when a transmission signal is the signal corresponding to the PAM-4, it is possible to carryout a signal transmission having a sufficient opening with a simple configuration.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor integrated circuit, comprising:
a first circuit configured to output a first signal obtained by carrying out digital-to-analog conversion on input data;
a high-pass filter configured to:
reduce a gain of a component, the component having a frequency lower than a particular cutoff frequency, in delayed input data obtained by delaying the input data, and
output the delayed input data having the reduced gain;
a second circuit configured to output a second signal obtained by carrying out the digital-to-analog conversion on the delayed input data that passes through the high-pass filter; and
a third circuit configured to drive a transmission signal, the transmission signal based on an addition signal obtained by adding the first signal output from the first circuit and the second signal output from the second circuit.

2. The semiconductor integrated circuit according to claim 1, wherein the high-pass filter includes a primary RC high-pass filter.

3. The semiconductor integrated circuit according to claim 1, wherein
a time constant of the high-pass filter is in a range of 0.5 to 1 unit intervals (UI) of the transmission signal.

4. The semiconductor integrated circuit according to claim 1, wherein the third circuit is configured as a source series terminated (SST) driver.

5. The semiconductor integrated circuit according to claim 1, wherein
the input data is input as differential data including positive phase side input data and negative phase side input data,
the first circuit is configured to carry out the digital-to-analog conversion on the positive phase side input data and on the negative phase side input data, and
the second circuit is configured to carry out the digital-to-analog conversion on both:
(i) the delayed positive phase side input data that passes through the high-pass filter, and
(ii) the delayed negative phase side input data that passes through the high-pass filter.

6. The semiconductor integrated circuit according to claim 1, wherein
the first circuit includes a plurality of first sub-circuits that are configured to respectively carryout the digital-to-analog conversion on the input data, and the first circuit is configured to add outputs of the plurality of first sub-circuits for output as the first signal, and
the second circuit includes a plurality of second sub-circuits that are configured to respectively carryout the digital-to-analog conversion on the delayed input data that passes through the high-pass filter, and the second circuit is configured to add outputs of the plurality of second sub-circuits for output as the second signal.

7. The semiconductor integrated circuit according to claim 6, wherein output terminals of the first sub-circuits are commonly connected.

8. The semiconductor integrated circuit according to claim 6, wherein output terminals of the second sub-circuits are commonly connected.

9. The semiconductor integrated circuit according to claim 6, wherein a number of the first sub-circuits is the same as a number of the second sub-circuits.

10. A transmission device, comprising:
a conversion circuit configured to carry out a parallel-to-serial conversion on input data for output;
a timing adjustment circuit configured to carry out a timing adjustment on data output by the conversion circuit;
a first circuit configured to output a first signal obtained by carrying out digital-to-analog conversion on input data subjected to the timing adjustment;
a high-pass filter configured to:
reduce a gain of a component, the component having a frequency lower than a particular cutoff frequency in delayed input data obtained by delaying the input data subjected to the timing adjustment, and
output the delayed input data having the reduced gain;
a second circuit configured to output a second signal obtained by carrying out the digital-to-analog conversion on the delayed input data that passes through the high-pass filter; and
a third circuit configured to drive a transmission signal, the transmission signal based on an addition signal obtained by adding the first signal output from the first circuit and the second signal output from the second circuit.

11. The transmission device according to claim 10, wherein the high-pass filter includes a primary RC high-pass filter.

12. The transmission device according to claim 10, wherein a time constant of the high-pass filter is in a range of 0.5 to 1 unit intervals (UI) of the transmission signal.

13. The transmission device according to claim 10, wherein
the third circuit is configured as a source series terminated (SST) driver.

14. The transmission device according to claim 10, wherein
the input data is input as differential data including positive phase side input data and negative phase side input data,
the first circuit is configured to carry out the digital-to-analog conversion on the positive phase side input data and on the negative phase side input data, and
the second circuit is configured to carry out the digital-to-analog conversion on both:
  (i) the delayed positive phase side input data that passes through the high-pass filter, and
  (ii) the delayed negative phase side input data that passes through the high-pass filter.

15. The transmission device according to claim 10, wherein
the first circuit includes a plurality of first sub-circuits that are configured to respectively carryout the digital-to-analog conversion on the input data, and the first circuit is configured to add outputs of the plurality of first sub-circuits for output as the first signal, and
the second circuit includes a plurality of second sub-circuits that are configured to respectively carryout the digital-to-analog conversion on the delayed input data that passes through the high-pass filter, and the second circuit is configured to add outputs of the plurality of second sub-circuits for output as the second signal.

16. The transmission device according to claim 15, wherein output terminals of the first sub-circuits are commonly connected.

17. The transmission device according to claim 15, wherein output terminals of the second sub-circuits are commonly connected.

18. The transmission device according to claim 15, wherein a number of the first sub-circuits is the same as a number of the second sub-circuits.

19. A control method of a transmission device, comprising:
outputting a first signal obtained by carrying out digital-to-analog conversion on input data;
reducing a gain of a component, the component having a frequency lower than a particular cutoff frequency, in delayed input data obtained by delaying the input data and outputting the delayed input data having the reduced gain;
outputting a second signal obtained by carrying out the digital-to-analog conversion on the delayed input data in which the component having the frequency lower than the predetermined cutoff frequency is reduced; and
driving a transmission signal, the transmission signal based on an addition signal obtained by adding the first signal and the second signal.

20. The control method according to claim 19, wherein
the input data is input as differential data including positive phase side input data and negative phase side input data, the method further comprising:
carrying out the digital-to-analog conversion on the positive phase side input data and on the negative phase side input data, and
carrying out the digital-to-analog conversion on both:
  (i) the delayed positive phase side input data in which the component having the frequency lower than the predetermined cutoff frequency is reduced, and
  (ii) the delayed negative phase side input data in which the component having the frequency lower than the predetermined cutoff frequency is reduced.

* * * * *